US006916438B2

United States Patent
Berry

(10) Patent No.: US 6,916,438 B2
(45) Date of Patent: Jul. 12, 2005

(54) METHODS FOR TEXTURING, PATTERNING AND BENDING POLYMER SHEET MATERIALS

(75) Inventor: Russell E. Berry, New Oxford, PA (US)

(73) Assignee: Allegheny Solid Surface Technologies, Hanover, PA (US)

( * ) Notice: Subject to any disclaimer, the term of this patent is extended or adjusted under 35 U.S.C. 154(b) by 224 days.

(21) Appl. No.: 10/125,689

(22) Filed: Apr. 17, 2002

(65) Prior Publication Data

US 2002/0167114 A1 Nov. 14, 2002

Related U.S. Application Data

(60) Provisional application No. 60/284,274, filed on Apr. 17, 2001.

(51) Int. Cl.[7] .................. B29C 59/18; B29C 61/02; B29C 61/04; B29C 61/06; B29C 61/10
(52) U.S. Cl. .................. 264/162; 264/230; 264/294; 264/295; 264/320; 264/322; 264/339
(58) Field of Search .................. 264/162, 230, 264/294, 295, 320, 322, 339

(56) References Cited

U.S. PATENT DOCUMENTS

| | | | | | |
|---|---|---|---|---|---|
| 2,368,085 | A | * | 1/1945 | Barbieri | 264/138 |
| 3,000,057 | A | * | 9/1961 | Swedlow et al. | 264/230 |
| 3,497,577 | A | * | 2/1970 | Wichterle | 264/2.4 |
| 3,594,457 | A | | 7/1971 | Wright | 264/24 |
| 3,847,865 | A | * | 11/1974 | Duggins | 524/437 |
| 3,872,194 | A | * | 3/1975 | Lowry et al. | 264/470 |
| 4,096,011 | A | | 6/1978 | Sanders et al. | 156/196 |
| 4,294,640 | A | | 10/1981 | Martinelli et al. | 156/213 |
| 4,348,449 | A | | 9/1982 | Seufert | 428/167 |
| 4,443,398 | A | | 4/1984 | Martinelli et al. | 264/235 |
| 4,521,265 | A | | 6/1985 | Kunihiko et al. | 156/229 |
| 4,693,773 | A | | 9/1987 | Davies | 156/200 |
| 4,701,232 | A | | 10/1987 | Werres | 156/271 |
| 4,702,497 | A | | 10/1987 | Newbery | 386/59 |
| 4,740,335 | A | * | 4/1988 | Scholz et al. | 264/485 |
| 4,759,815 | A | | 7/1988 | Frey | 156/222 |
| 5,008,059 | A | * | 4/1991 | Kaeufer et al. | 264/230 |
| 5,151,152 | A | * | 9/1992 | Kaeufe et al. | 216/53 |
| 5,409,369 | A | | 4/1995 | Win | 425/384 |
| 5,427,724 | A | * | 6/1995 | Zimmerman | 264/134 |
| 5,533,880 | A | | 7/1996 | Hayakawa et al. | 425/328 |
| 5,589,246 | A | * | 12/1996 | Calhoun et al. | 428/120 |
| 5,738,815 | A | | 4/1998 | Laskey et al. | 264/323 |
| 6,083,339 | A | * | 7/2000 | Peters et al. | 156/245 |
| 2003/0113485 | A1 | * | 6/2003 | Schober | 428/13 |

FOREIGN PATENT DOCUMENTS

JP          63-205214 A   *   8/1988   ........... B29C/59/04

OTHER PUBLICATIONS

English abstract of JP 63–205214 A, Japanese Patent Office, 1998.*

* cited by examiner

Primary Examiner—Michael P. Colaianni
Assistant Examiner—Michael I. Poe
(74) Attorney, Agent, or Firm—Reed Smith LLP

(57) ABSTRACT

The texturing, patterning and bending of a solid surface material. The end product can be achieved both through casting technologies and heat pressure processes. Controlled surface deformation can be created in a pre-manufactured flat sheet and the sheet can then be heated and bent using conventional thermoforming technology. This contrasts considerably with the conventional norm, whereby an embossed solid surface sheet, when reheated, loses its embossing.

13 Claims, 5 Drawing Sheets

METHODS FOR TEXTURING, PATTERNING AND BENDING POLYMER SHEET MATERIALS

CROSS-REFERENCE TO RELATED APPLICATION

This application claims priority from U.S. Provisional Patent Application Ser. No. 60/284,274, filed on Apr. 17, 2001.

FIELD OF THE INVENTION

The present invention generally relates to methods and arrangements for texturing and patterning polymer sheet materials.

BACKGROUND OF THE INVENTION

Flat sheet stock (such as polymer sheet stock) can traditionally be heated and formed. Further, such material can traditionally be heated and embossed. However, one process tends to negate the other. In other words, if one were to heat and bend stock, reheating the material for embossing would cause the material to return to its original molecular configuration and the bend would be lost. On the other hand, heating and embossing and then reheating for the purpose of bending causes the material to return to its original molecular configuration, such that the embossing is lost.

Accordingly, it is conceivable that one way to achieve both results is to perform both methods essentially at the same time. However, the cost of doing so has long appeared to be prohibitive.

A need has thus been recognized in connection with achieving both of the aforementioned results in a manner that is not cost-prohibitive.

SUMMARY OF THE INVENTION

In one aspect, the present invention involves texturing, patterning and then bending the surface of a solid surface material which may be composed, for instance, of about 75% aluminum trihydrate and about 25% methymethacrylate, originally cast and finished as a flat sheet. The end product can be achieved both through casting technologies and heat pressure processes. A unique aspect resides in that one can create controlled surface deformation in a pre-manufactured flat sheet and in that the sheet can then be heated and bent using conventional thermoforming technology used presently in the industry. This contrasts considerably with the conventional norm, whereby an embossed solid surface sheet, when reheated, loses its embossing.

Generally, there is broadly contemplated in accordance with at least one presently preferred embodiment of the present invention a method of forming polymer material, the method comprising the steps of: providing polymer material having first and second surfaces; imparting a first configuration to the first surface of the polymer material; and thereafter imparting a second configuration to the second surface of the polymer material, the second configuration comprising an altered version of the first configuration.

Further, there is broadly contemplated in accordance with at least one presently preferred embodiment of the present invention apparatus for forming polymer material, the apparatus comprising: an arrangement for imparting a first configuration to a first surface of polymer material; and an arrangement for thereafter imparting a second configuration to a second surface of polymer material, the second configuration comprising an altered version of the first configuration.

BRIEF DESCRIPTION OF THE DRAWINGS

The present invention and its presently preferred embodiments will be better understood by way of reference to the detailed disclosure herebelow and to the accompanying drawings, wherein.

DESCRIPTION OF THE PREFERRED EMBODIMENTS

In accordance with at least one presently preferred embodiment of the present invention, surface deformation is created by using embossing and heating, as well as by way of the polymer memory inherent in a material being worked (such as the solid surface material described above), to one's advantage as opposed to disadvantage. Preferably, one may heat and emboss and then machine the material, removing the layer of material that was deformed in the embossing process to create a level surface. Upon reheating the material, the polymer memory returns the material to its original location and the negative image (or, as defined herebelow, reverse or mirror-image configuration) of the surface deformation is created. The second heating creates the negative surface deformation and, with the material heated as the last stage of creating the new surface, the material can now be removed and formed with industry-standard solid surface fabrication technologies. Moreover, the material can be reheated over and over without losing the pattern, texture or surface deformation.

Additionally, a process for creating negative impressions is capable of producing surface transitions with a level of precision that cannot apparently be achieved using standard heat pressure technology. Using standard technology, the tensile strength of the material represents a constraint for the level of detail that can be embossed into a surface. In accordance with at least one preferred embodiment of the present invention, this constraint no longer holds while a different, albeit positive, constraint is represented by the polymer memory, which allows for angles of transition not possible with any other technology. In sum, the levels of detail obtainable in accordance with at least one embodiment of the present invention are significantly better than the levels of detail that can typically be obtained through conventional approaches.

Figure 1:
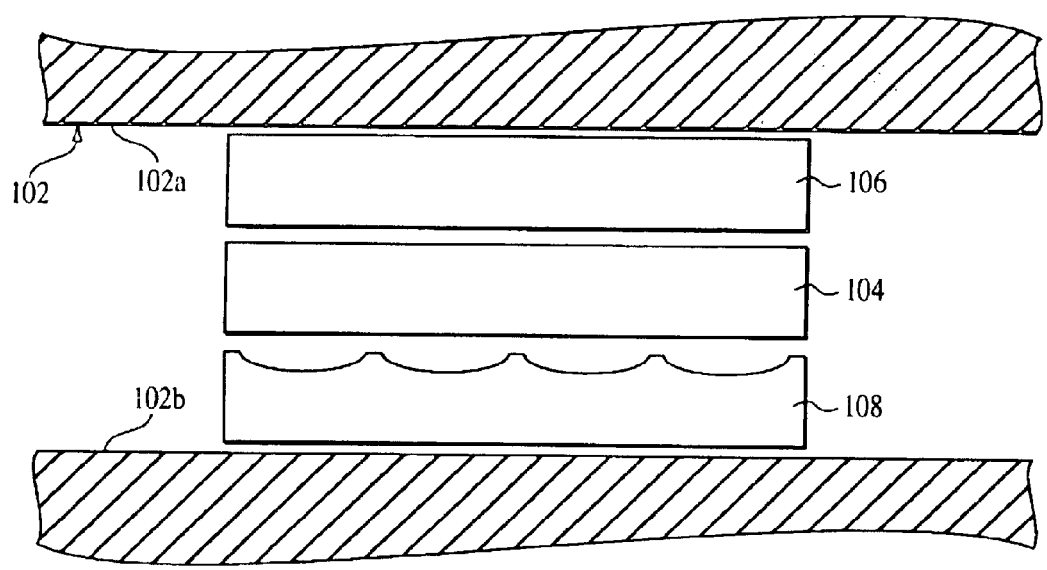
FIG. 1 illustrates an initial stage of a texturing, patterning and bending process.
Figure 1A:
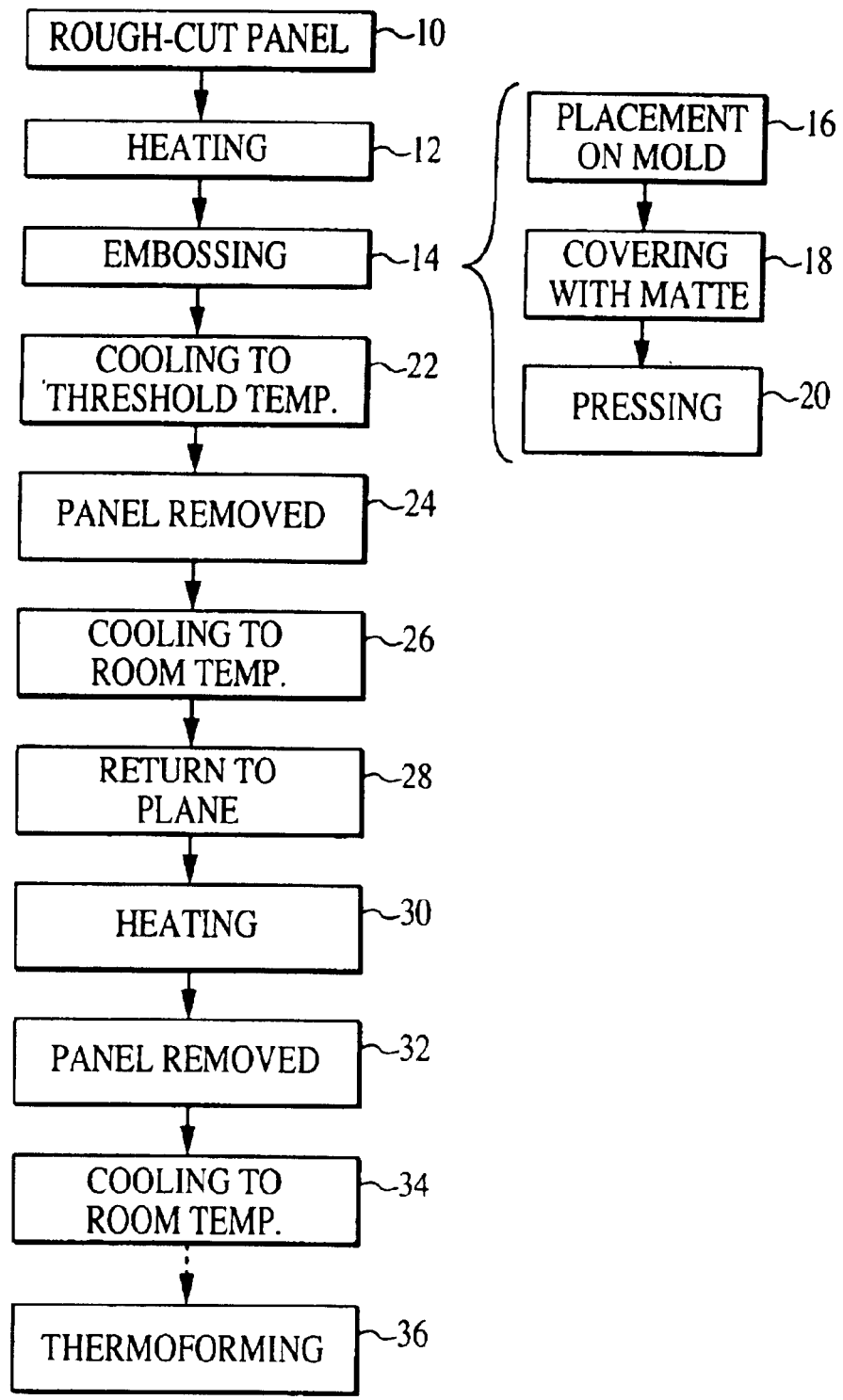
FIG. 1a is a schematic block diagram of a general texturing, patterning and bending process.

With reference to FIG. 1a, the following is a rough summary of a process that may be employed in accordance with at least one embodiment of the present invention:

1. The panel of thermoplastic solid surface material (such as that described and alluded to heretofore) may be pre-cut to a rough size (10).

2. For heating (12), the panel may preferably be introduced to an oven, preferably a platen oven.
   a. To this end, appropriate heat may be supplied (depending on gauge of material) to adequately and consistently heat the material to, but not above, the thermoforming point of the material.
   b. At this point, the thermoplastic solid surface material will be capable of manipulation.
3. The panel is thence preferably embossed (14).
   a. To this end, a mould is preferably supplied. It could be fabricated by use of essentially any known fabrication technique. Preferably, the mould is adapted to be of sufficient density and strength to withstand the heat, pressure, and number of pressings at hand. Presently preferred materials which may be chosen for the mould include aluminum, magnesium, stainless steel and some high density cast resins. (Though wood products could be used for moulds, it is recognized that these might degrade quickly.)
   b. A silicone rubber matte, or other material with sufficient thickness (typically ½" and, preferably, durometer rating 30–40, is thence preferably supplied to transfer the force generated by the flat press (preferably a standard flat press having a true, planar surface) to a deformed surface.
   c. Accordingly, the material (i.e., the heated panel) is preferably placed on the mould (16), covered in entirety with the silicone rubber (or alternatively formed) matte (18), and then pressed (20). The silicone rubber (or other) matte thence transfers the force of the press to the material and exerts force uniformly onto the irregular surface of the heated panel.
   d. To this end, the material is preferably pressed using developed forces of at least about 75 psi. Greater forces can be applied to surfaces which are more intricate and more highly distorted. Forces up to about 975 psi or higher can conceivably be used (and have been successfully tested).
   e. While under pressure, the material is preferably cooled, e.g., at least to a threshold temperature, e.g., of about 150° F.
4. The material (i.e., the panel) is then preferably removed (24) when its temperature is below the threshold temperature, e.g. below about 150° F.
5. The material is then preferably cooled to room temperature (26) while constrained in a suitable cooling apparatus, to prevent the material from warping.
6. A surface of the material is thence preferably returned mechanically to plane (28).
   a. To this end, a face of the material is preferably machined to remove surface irregularities introduced by the heat pressure process.
   b. The face of the material is then preferably sanded to a desired finished sheen.
7. The material (in panel form) is thence preferably heated (30), using e.g. a platen oven, to a temperature of about 275° F. As described below, this will result in imparting to the planar surface a configuration that is essentially a reversal of that which was initially moulded into the opposite surface.
8. The material is thence preferably removed (32), and cooled to room temperature (34) under pressure (to keep the material planar).
9. If desired, the panel may thence be formed (36) using standard thermoforming technology. Any surface texture, pattern, or deformation will be retained during heating.

To better appreciate processes such as those encompassed by the steps described above, FIGS. 1–6 illustrate an arrangement for forming polymer material in accordance with at least one presently preferred embodiment of the present invention.

FIG. 1 relates to a stage of initial processing and, as such, illustrates a platen press 102, having upper and lower portions 102a and 102b, respectively. Indicated at 104 is the material to be formed, which itself is sandwiched between a silicon rubber matte 106 and a mould 108. The matte preferably is about ½ inch thick and may have a durometer rating of 30–40. Mould 108 preferably has a desired surface texture, pattern or deformation intended to be imparted to material 104. Essentially any conceivable texture, pattern or surface deformation may be used.

Preferably, the solid surface material 104 may be heated to between about 275° F. and about 325° F.

Figure 2:
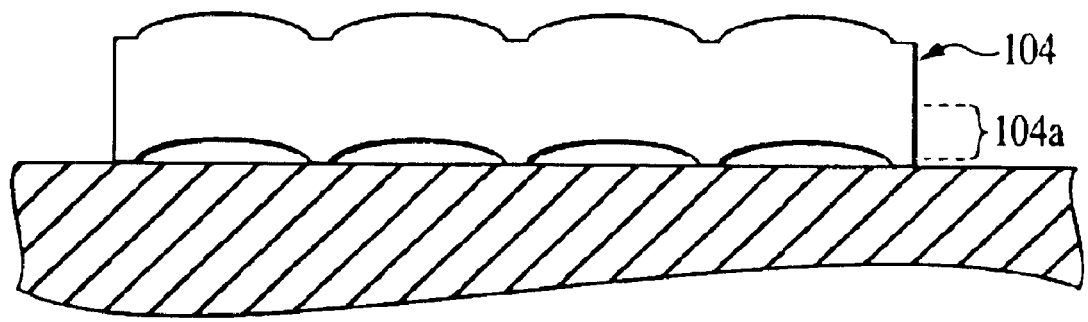
FIG. 2 illustrates post-press and embossed material in a texturing, patterning and bending process.

FIG. 2 illustrates material 104 in post-press and embossed form. As shown, a back side 104a of the material will have been deformed by pressing. In accordance with at least one embodiment of the present invention, it has been found that the new (post-press and embossed) surface of material 104 will replicate original detail from the mould to an accuracy on an order of magnitude of about 0.001".

Figure 3:
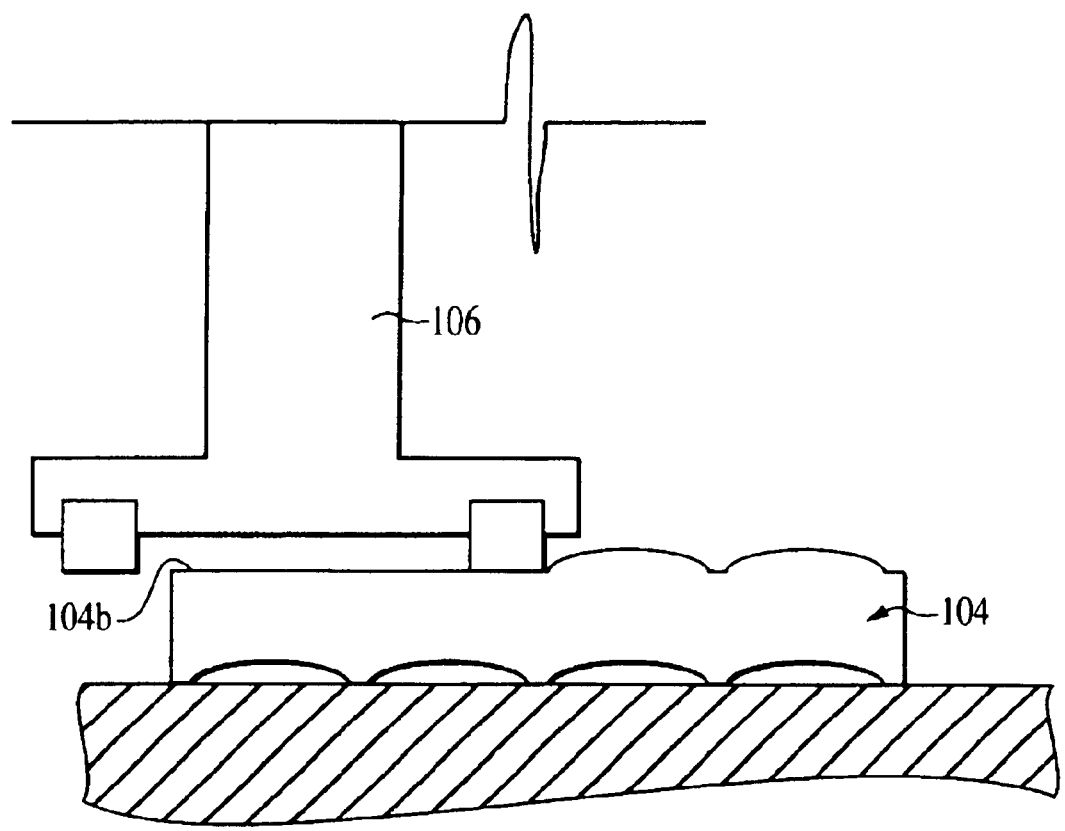
FIG. 3 illustrates the mechanical resurfacing of material in a texturing, patterning and bending process.

FIG. 3 relates to the mechanical resurfacing of material 104. Particularly, any deformities on a front face 104b of material 104 are flattened, or returned to plane. Essentially any suitable equipment (indicated at 106) may be utilized for this purpose, such as a router with a CNC (computer numerically controlled) router bit. (A CNC router bit is a cutting tool made of metal that is placed in a router [machine] which in turn spins the tool, e.g. at a rate of about 10,000 RPMs, and moves the tool across the surface of the material.) Those of ordinary skill in the art will of course recognize that other processes for flattening or planing front face 104b of material 104 are possible.

Figure 4:
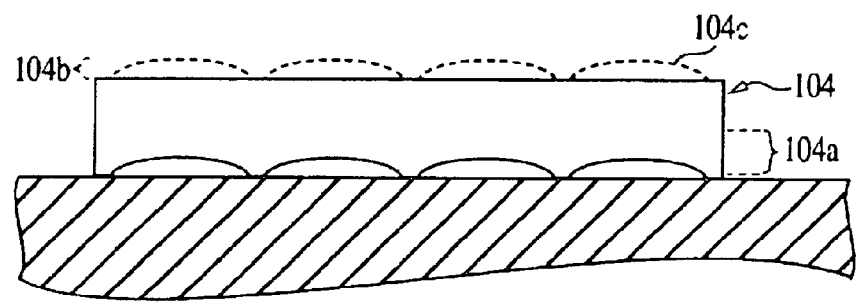
FIG. 4 illustrates material prior to final heating in a texturing, patterning and bending process.

FIG. 4 illustrates the material 104 prior to final heating. As shown, the back portion 104a remains deformed, while a quantity of material (indicated by the dotted line at 104c) has been removed from the front portion 104b.

Figure 5:
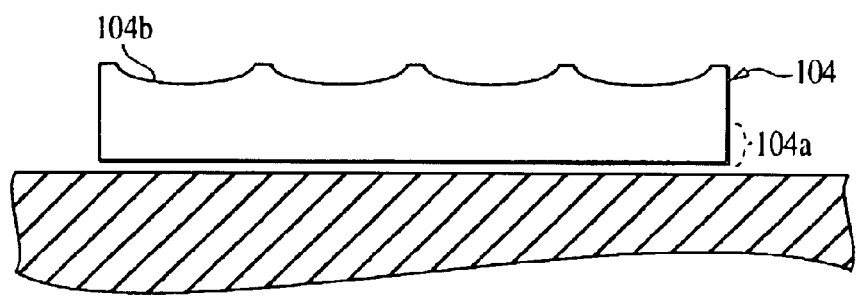
FIG. 5 illustrates material after final heating in a texturing, patterning and bending process.

FIG. 5 illustrates the material 104 after final heating, with a final surface configuration. As described previously, the heat induces polymer memory, creating a surface image at front portion 104b. In turn, the back portion 104a returns to plane. It will be appreciated that the configuration of the surface of front portion 104b in FIG. 5 is essentially the reverse, or mirror-image of, the configuration of the surface of back side 104a in FIG. 4. Thus, a first configuration will have been imparted to the surface of back side 104a but then a second configuration will have been imparted to the surface of front portion 104b, the second configuration being a reversal (or mirror-image with respect to a central longitudinal axis of the material 104) of the first configuration.

Figure 6:
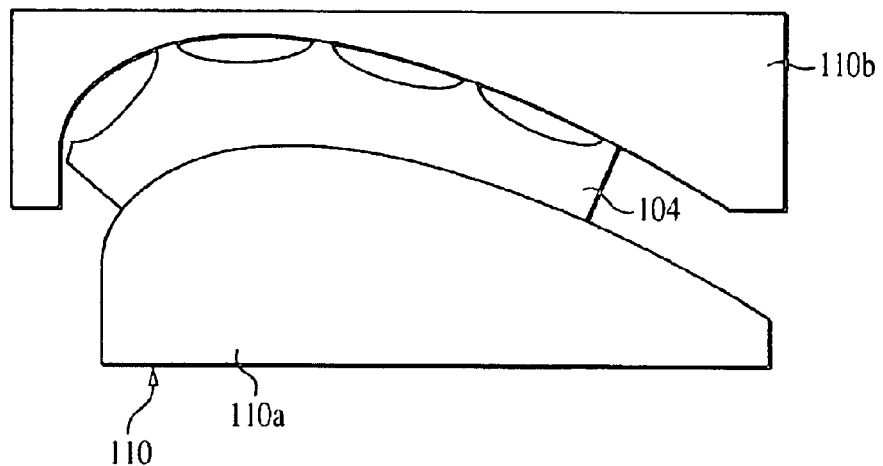
FIG. 6 illustrates the thermoforming of patterned material in a texturing, patterning and bending process.

FIG. 6 illustrates the patterned material 104 being thermoformed. As shown, it may be thermoformed, for example, in a bent configuration in a conventional mould 110 (illustrated as having two parts 110a and 110b. As discussed previously, the surface configuration of material 104 will be retained, without being compromised, subsequent to thermoforming.

In recapitulation, it will be appreciated that at least one presently preferred embodiment of the present invention relates not necessarily to an entirely new technology or piece of equipment but to an innovative and unique sequencing and arrangement of existing material characteristics and manufacturing processes.

It will further be appreciated that at least one presently preferred embodiment of the present invention allows for the creation of patterns in solid polymer sheet stock which can be bent into curved surfaces. Conventional heat pressure processes may only allow for patterning, but not for bending or thermoforming the sheet stock; essentially, only flat sheet with surface textures can be created in such instances. In contrast, at least one presently preferred embodiment of the present invention allows for texturing the surface and bending or thermoforming the surface.

It will be appreciated that in a conventional process, a heat-and-pressure process is involved which displaces the material from a uniform flat surface by pressing the hot sheet against a mould having a surface treatment which is imprinted on the material, and cooling the sheet under pressure against the mould. In accordance with at least one embodiment of the present invention, this process is performed and then one may proceed in the following manner. One may mechanically remove the outer surface of the sheet stock containing the pattern or texture. This process effectively returns the previously textured or embossed surface (created as stated above) to plane. Then, one may preferably reheat the material in a double-sided platen oven to a specific temperature. Polymer memory properties of the material, combined with the appropriate heat, time and pressure make the molecules in the material return to their original location when the sheet was first cast or to the same orientation prior to the heat-pressure process. When this occurs, the material that was mechanically removed in the first step creates a void in the surface which is the opposite of the texture imparted by the heat-pressure process. Because of the thermoplastic nature of the acrylic solid polymer sheet stock, one can then remove the sheet from the oven and bend the sheet. In contrast to conventional processes, a process undertaken in accordance with at least one embodiment of the present invention permits the creation of surfaces for applications involving essentially any radius.

In accordance with at least one presently preferred embodiment of the present invention, the material to be embossed, heated and bent may be the "CORIAN" material manufactured by Dupont.

In further recapitulation, the present invention provides, in one aspect, a method of forming polymer material, wherein a configuration is imparted to at least one surface of the material and an altered version of the same configuration is imparted to another surface of the material. In a further refinement, the "altered version" of the configuration is a reversal of the configuration. In another refinement, the material is bent subsequent to the "altered version" of the configuration being imparted to aforementioned "another surface" of the material.

Additionally, the present invention provides, in another aspect, apparatus for forming polymer material, wherein a configuration is imparted to at least one surface of the material and an altered version of the same configuration is imparted to another surface of the material.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. All changes which come within the meaning and range of equivalency of the claims are to be embraced within their scope.

What is claimed is:

1. A method of forming polymer material, said method comprising the steps of:

providing polymer material having first and second surfaces;

imparting a first configuration to the first surface of the polymer material; and thereafter imparting a second configuration to the second surface of the polymer material, the second configuration comprising an altered version of the first configuration;

the first and second surfaces being substantially parallel to one another prior to said step of imparting the first configuration to the first surface;

the second configuration comprising a mirrored version of the first configuration with respect to a central longitudinal axis between the first and second surfaces;

said step of imparting a first configuration comprising:
providing a mould adapted to impart the first configuration to a surface;
heating the polymer material in preparation for the mould;
imparting the first configuration to the polymer material via the mould; and
removing the polymer material from the mould;

said step of imparting a second configuration comprising:
cooling the polymer material subsequent to removal of the polymer material from the mould;
thereafter rendering the second surface substantially planar; and
thereafter reheating the polymer material, whereby the first surface is rendered substantially planar and the second configuration develops at the second surface.

2. The method according to claim 1, further comprising the step of bending the polymer material subsequent to imparting the second configuration to the second surface.

3. The method according to claim 1, wherein the first and second configurations comprise textured configurations.

4. The method according to claim 1, wherein the polymer material includes memory properties.

5. The method according to claim 1, wherein a deformed configuration appears at the second surface as the first configuration is being imparted to the first surface.

6. The method according to claim 1, wherein said heating step comprises heating the polymer material to at least about 275° F.

7. The method according to claim 6, wherein said reheating step comprises heating the polymer material to a temperature of between about 275° F. and about 325° F.

8. The method according to claim 1, wherein the polymer material comprises aluminum trihydrate and methymethacrylate.

9. The method according to claim 8, wherein the polymer material comprises about 75% aluminum trihydrate and about 25% methymethacrylate.

10. The method according to claim 1, wherein said step of imparting a first configuration further comprises:
pressing the polymer material against the mould.

11. The method according to claim 10, wherein said step of imparting a first configuration comprises sandwiching the polymer material between the mould and a matte.

12. The method according to claim 11, wherein the matte is configured for uniformly transferring a force from a press component to the polymer material while still permitting deformation of a surface of the polymer material which contacts the matte.

13. The method according to claim 12, wherein a deformed configuration appears at the second surface as the first configuration is being imparted to the first surface.

* * * * *